United States Patent
Papachristou

[15] 3,691,393
[45] Sept. 12, 1972

[54] AUTOMATIC STARTER FOR INTERNAL COMBUSTION MACHINES

[72] Inventor: Christos Papachristou, Vassiliko, Halkis, Greece

[22] Filed: March 30, 1971

[21] Appl. No.: 129,485

[30] Foreign Application Priority Data

April 1, 1970 Greece.................39,620

[52] U.S. Cl. .......................290/30, 307/64, 290/38, 123/179 H
[51] Int. Cl............................................F02n 11/08
[58] Field of Search.....307/64, 65, 68; 290/30, 30 A, 290/4; 123/177 H, 14 SA, 142.5

[56] References Cited

UNITED STATES PATENTS

| | | | |
|---|---|---|---|
| 3,181,000 | 4/1965 | Siegel et al. | 307/64 |
| 3,551,686 | 12/1970 | Koehler | 290/38 |
| 3,371,656 | 3/1968 | Stauffer et al. | 290/37 X |
| 2,972,056 | 2/1961 | Park et al. | 290/30 B |
| 3,558,901 | 1/1971 | Jacobus | 290/4 |
| 3,283,165 | 11/1966 | Bloch | 307/64 |

*Primary Examiner*—G. R. Simmons
*Attorney*—Clarence A. O'Brien and Harvey B. Jacobson

[57] ABSTRACT

An engine driven generator is associated with a current responsive relay to a signal from a preheating control circuit in response to loss of power from a main supply. The preheating control circuit sequentially effects energization of an engine glow plug and a starter to automatically start the engine. When a combustion gas sensor detects proper engine operation, the starter is disconnected and isolated. Restoration of power to the load from the generator latches the starter in its isolated condition.

14 Claims, 4 Drawing Figures

Christos Papachristou
INVENTOR.

BY Clarence A. O'Brien
and Harvey B. Jacobson
Attorneys

Christos Papachristou
INVENTOR.

AUTOMATIC STARTER FOR INTERNAL COMBUSTION MACHINES

This invention relates to a power plant from which electrical energy is supplied to a load, the power plant including an internal combustion engine and starter mechanism with means for automatically starting the engine in the event of any interruption in the supply of electrical energy to a load.

Auxiliary electric power plants of the combustion fuel type forming a standby power source require starting of an engine through its starting system when there is a loss in power from the main supply. Accordingly, such power plants require constant supervision and furthermore, require a careful procedure for starting the engine in order to protect the starting system from damage. It is therefore an important object of the present invention to provide in association with combustion engine types of power plants, a system for continuously monitoring operation of the power plant and automatically starting the engine in the event there is any loss of power together with means for preventing damage to the starting system of the power plant from untimely starter operation.

In present invention relates to a power plant constituting a reliable standby source of electrical energy for a load such as a lighting system, or a refrigerating apparatus that cannot tolerate any substantial reduction or interruption of power for any prolonged period of time. A current responsive relay monitors the supply of current to the load so as to produce a signal in response to any reduction or interruption in power. The signal is supplied to a preheat control circuit in order to initiate an engine starting procedure which involves energization of the glow plug associated with the engine followed by energization of the starting device which may be an air compressor in the case of a diesel type engine. Once normal engine operation occurs, this condition is detected by a combustion gas sensor through which the starting device is disabled. Subsequent operation of the starting device is prevented by a latching relay responsive to normal operation of the generator driven by the engine.

The preheat control circuit and glow plug circuit associated with the engine are arranged to produce the requisite amount of preheating of the engine prior to operation of the starter in order to obtain smooth and efficient starting of the engine. In the event there is any malfunction of the glow plug circuit, starting of the engine is attempted without preheating. Indicators are provided to signify as well malfunction of the preheating circuit as to indicate any reduction or interruption of output power from the power plant initiating the automatic starting cycle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
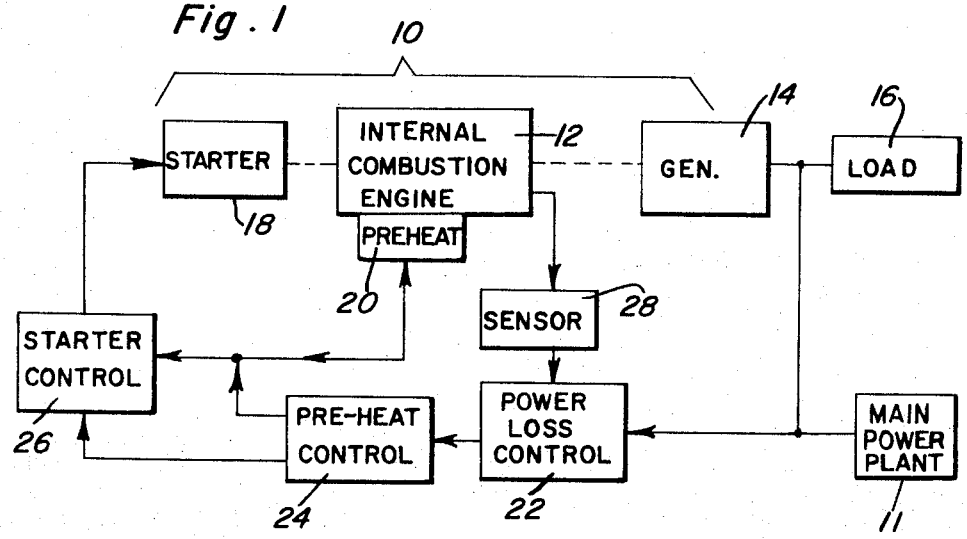
FIG. 1 is a schematic block diagram illustrating the system of the present invention.

Referring now to the drawings in detail, FIG. 1 diagrammatically illustrates a main power plant 11 and an auxiliary power plant generally referred to by reference numeral 10 which includes a prime mover in the form of an internal combustion engine 12, an electrical generator 14 driven by the engine for supplying electrical energy to load 16 and a starter device generally referred to by reference numeral 18. The engine 12 may by way of example be a diesel engine while the starter device 18 may be an air compressor arranged to render the fuel charge to the engine self-igniting particularly when the cylinders of the engine have been preheated by a glow plug heating device 20 associated with the engine.

Should there by any interruption in normal operation of the main power plant, there will be a corresponding reduction in power or interruption of power to the load which may be caused by various conditions such as a drop in temperature or a sharp reduction in engine speed. As a result of such reduction of interruption in power to the load, power loss control component 22 dispatches a signal to a preheat control component 24 through which the engine starting procedure is initiated. The preheat control component is initially operative to energize the engine heating facility 20 and then the starter 18 through the starter control component 26. The starter control component 26 is furthermore operative to isolate the starter 18 from the other components once the engine has started in order to prevent damage to the system. Toward that end, operation of the engine is detected by means of a sensor 28 which is operative to terminate the automatic starting cycle through the power loss control component 22. The power loss control component 22 is furthermore operative to latch the system in its inoperative condition once restoration of power to the load is sensed.

Figure 2A:
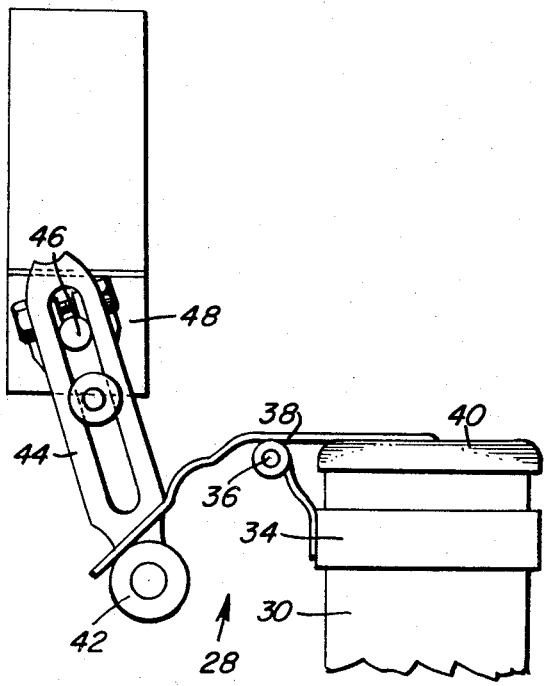
FIGS. 2a and 2b are partial side elevational views of the engine operational sensor associated with the system in two different operational phases.
Figure 2B:
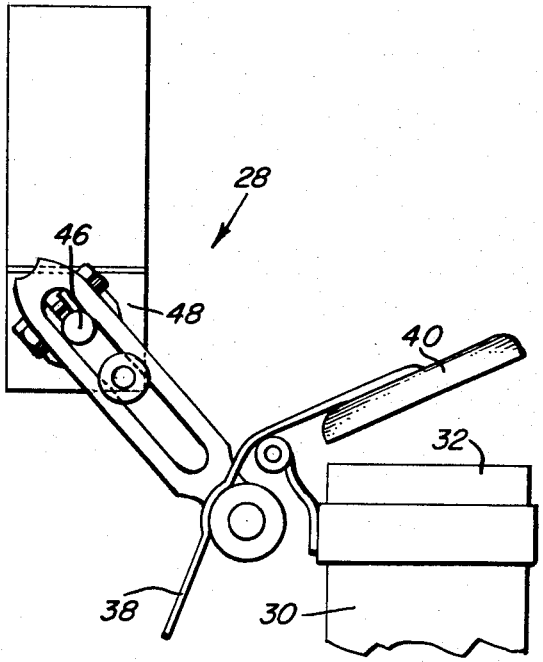

FIGS. 2a and 2b illustrate one form of engine operational sensor 28 of the exhaust gas pressure type. As is well known in connection with diesel engines, a vertical exhaust gas conduit 30 is provided for upward discharge of combustion products from an outlet opening 32. A mounting band 34 is secured to the exhaust tube adjacent to but below the outlet opening to carry a pivot 36. An angulated lever element 38 is pivotally supported by the pivot 36 and has a cover 40 connected to one end normally biased gravitationally to a closed position as illustrated in FIG. 2a. The lever element 38 is engaged on the side of the pivot 36 opposite the cover 40 by a roller 42 connected to the lower end of a slotted actuator arm 44. The actuator arm 44 is connected to the actuator shaft 46 of a limit switch 48 which functions in a manner to be described in detail hereafter.

Figure 3:
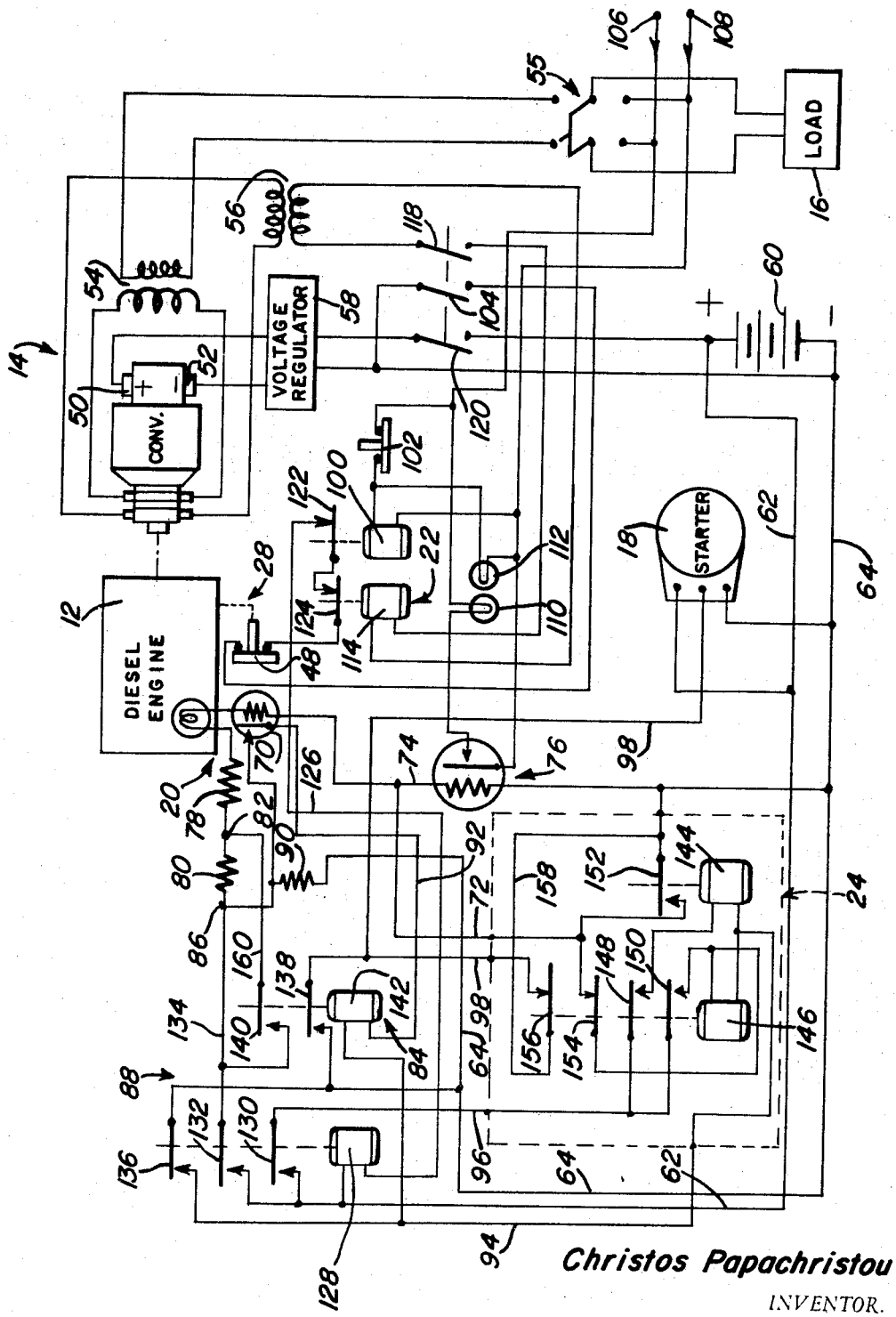
FIG. 3 is an electrical circuit diagram corresponding to the system of the present invention.

FIG. 3 diagrammatically illustrates a typical diesel engine 12 and an electrical generator 14 having DC output terminals 50 and 52. A main output from one set of brushes supplies the load 16 through output transformer 54 and a load switch 55 and a second set of brushes supplies a transformer 56 once full power is developed at transformer 54. The DC output terminals may be connected through a voltage regulator 58 to the opposite terminals of a standby storage battery 60 by means of which the starter device 18 is energized. The battery 60 also furnishes energizing voltage for the other components of the automatic starting system by means of the positive and negative voltage lines 62 and 64 connected to the output terminals of the battery.

The heating facility 20 associated with the diesel engine includes a glow plug 68 connected on one side to a thermal overload device 70. The resistive element of device 70 is connected by conductor 72 to the preheat control circuit 24 and by conductor 74 to a malfunction sensing relay 76 which in turn is connected to the negative voltage line 64. The side of the glow plug 68 opposite the thermal overload device 70 is connected to a voltage dividing network including the resistors 78 and 80. The juncture 82 between the resistors 78 and 80 is connected to a starter relay 84 while the terminal 86 is connected to a starter isolation relay 88 and through a resistor 90 to the negative voltage line 64. The positive and negative voltage lines are also connected to the starter isolation relay 88 which in turn is connected by conductors 94 and 96 to the preheat control circuit 24. A conductor 98 connects the preheat control circuit to the starter relay 84 and one terminal of the starter device 18 for initiating operation thereof, the other two terminals of the starter device being connected to the negative and positive voltage lines 62 and 64.

The power loss control component 22 includes a current responsive relay coil 100 one terminal of which is connected through a normally closed manual test switch 102 to one of the main power supply terminals 106. The other main terminal 108 is connected to the other terminal of the current responsive relay coil 100 and to the switch of the malfunction detecting relay 76. The switch contact associated with the relay 76 is connected in series with the preheat malfunction indicator lamp 110 to the power input terminal 106 in order to energize the indicator lamp 110 if there is any malfunction in the preheating facility. A second indicator lamp 112 is connected across the terminals of the current sensing relay coil 100 in order to indicate the condition of the main power supply. Also associated with the power loss component 22, is a functional latch relay 114 connected to the output of the transformer 56 through the switch section 118 which is ganged with the switch section 104 as well as the switch section 120 interconnecting the positive voltage terminal 50 of the generator with the positive voltage line 62 through the voltage regulator 58. The relay coils 100 and 114 are associated with series connected, normally closed relay switches 122 and 124. The latter relay switches are furthermore connected in series with the sensor switch 48 to the negative voltage line 64 through switch section 104 for supplying a signal to the starter isolation relay 88 through signal line 126.

The starter isolation relay 88 includes a relay coil 128 to which the signal line 126 is connected. The relay coil 128 is furthermore connected to the positive voltage line 62 so that an energizing circuit is completed through the signal line 126, The series connected relay switches 122 and 124, the sensor switch 48 and the switch section 104 to the negative voltage line. Also associated with the relay 88 are normally opened relay switches 130 and 132 by means of which the positive voltage line 62 is connected respectively to the conductor 96 and the conductor 134 in order to supply positive voltage to the preheat control circuit and to the glow plug circuit 20. A third normally opened relay switch 136 connects the negative voltage line 64 to the preheat control circuit 24 when the relay coil 128 is energized.

The positive voltage line 64 and the conductor 134 are respectively connected to the contacts associated with the normally opened relay switches 138 and 140 of the starter relay 84 which has a relay coil 142. The terminals of the relay coil 142 are connected to the conductor 92 from the thermal overload relay 70 and to the conductor 94.

The preheat control circuit 24 includes relay coils 144 and 146 having terminals connected in common to the conductor 94 from the starter isolation relay 88 by means of which the common terminals of relay coils 144 and 146 are connected through relay switch 136 to the positive voltage line 64 when the relay coil 128 is energized. The other terminal of relay coil 144 in the preheat control circuit is connected to the contact of the normally opened relay switch 148 while the other terminal of the relay coil 146 is connected to the contact associated with the normally open relay switch 150. The relay switches 148 and 150 are both connected through conductor 96 to the normally opened relay switch 130 associated with the starter isolation relay 88 by means of which the negative voltage line is connected to the preheat control circuit. The relay switch 150 constitutes a holding switch for maintaining the relay coil 146 energized while the relay switch 148 is operative to energize the relay coil 144 in order to close its normally opened relay switch 152. The normally open contact of the relay switch 152 is connected to conductor 72 from the overload relay device 70 of the glow plug circuit and to the contact associated with the normally closed relay switch 154 adapted to be opened upon energization of the relay coil 146 which also opens the normally closed relay switch 156 interconnected by conductor 158 with the normally opened relay switch 152 to which the negative voltage line 64 is connected.

FIG. 3 illustrates all of the relay switches in their normal positions with the associated relay coils deenergized. The system is placed into operation by the closing of the ganged switch sections 104, 118 and 120. It will be apparent that when the main power plant is running under normal operating conditions, only the relay coil 100 will be energized so as to hold its associated relay switch 122 in open position. Accordingly, the other relay coils 128, 142, 144 and 146 will be deenergized. Should there by any reduction or interruption in power at the input terminals 106 and 108, the current responsive relay coil 100 will be deenergized so that its normally closed relay switch 122 will close. Since relay coil 116 is also deenergized, its associated relay switch 124 completes an energizing circuit through the relay coil 128. Upon energization of the relay coil 128, the normally opened relay switch 132 is closed so as to apply a potential from the positive voltage line 62 through conductor 134 to the terminal 86 of the glow plug circuit 20. Initially, the overload device 70 conducts current from the terminal 86 through the resistors 80 and 78 and the glow plug 68 to the normally closed relay switch 154 thereby completing an energizing circuit through the relay coil 146 associated with the preheat control circuit. Upon energization of the relay coil 146, the normally opened relay switch 150 is closed so as to complete a relay holding circuit for the relay coil 146 through the actuated relay switch 130. Also, the relay switch 148 upon energization of the relay coil 146 completes an energizing circuit for the relay coil 144 so as to close its normally opened relay switch 150. The relay coil 146 remains energized as aforementioned upon opening of the normally closed relay switch 154 transferring the connection of the overload device 70 through conductor 72 to the actuated relay switch 152 to thereby bypass the relay coil 146 from the glow plug circuit to which the relay coil 146 is initially connected in series. Accordingly, the current flow through overload device 70 increases to thereby effectively heat the engine cylinders through the glow plug 68 for preheating purposes. Further, when the relay coil 146 is energized, the relay switch 156 is open so as to disconnect the negative voltage line 64 from conductor 98 to the starter device 18 preventing operation thereof while the engine is being preheated.

After the engine is preheated by an amount determined by the device 70, preheating is terminated by closing of its normally open switch. Current will then flow from the input terminal 86 through the actuated switch of the device 70 in parallel relation to the glow plug circuit in order to complete an energizing circuit through the relay coil 142 of the starter relay 84 and reduce the current flow through the glow plug circuit. Energization of the relay coil 142 closes the normally open relay switch 138 connecting the negative voltage line 64 to the starter device 18 through conductor 98 in order to initiate starting. At the same time, the normally opened relay switch 140 is closed so as to short out the resistor 80 by means of the conductor 160 interconnecting the relay switch 140 the juncture 82. The resistance of the glow plug 68 is thereby reduced so as to compensate for the reduction in current through the overload device 70 in order to maintain its thermal switch closed and the relay coil 142 energized.

When the engine 12 becomes fully operative, the sensor switch 48 opens as hereinbefore described thereby interrupting the energizing circuit for the relay coil 128. Upon deenergization of the relay coil 128, the associated relay switches open so as to disconnect the energizing circuits associated with the relay coils 144, 146 and 142. The automatic starting cycle is thereby terminated. When the output power from the generator reaches operating value, the latch relay coil 114 is energized to open its normally closed relay switch 124 to prevent initiation of another automatic cycle. The load switch 55 may then be displaced to a position transferring the load 16 to the output terminals of the transformer 54 for supply of power from the generator 14.

The indicator lamp 112 being connected across the terminals of the relay coil 100, will signify loss of power from the main power supply when it is extinguished. The indicator lamp 110 on the other hand will signify malfunction of the preheating control component 24 by excessive current flow through its thermal element in series with the glow plug circuit as determined by the parallel connected load resistor 90 to actuate the thermal switch associated with relay 76. Further, in the event there is such malfunction of the preheating control component, current of a sufficient magnitude will then flow through the thermal relay 70 closing its normally open switch in order to immediately energize the relay coil 140 of the starter relay 84. The starter device 18 will then be energized in order to attempt starting without preheating.

Thus, the engine 12 is automatically started whenever power to the load 16 is interrupted so that auxiliary power will be available when the load is transferred to the engine driven generator. The indicator 112 will signify when such transfer is needed while indicator 110 will signify the condition of the preheating control. To test the system, the test switch 102 may be opened to deenergize relay coil 100.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an internal combustion engine having cylinder heating means and an electrical generator driven by the engine for supplying energy to a load, means for automatically starting the engine in response to interruption in power supplied to the load comprising an engine starter device operatively connected to the engine, operational sensing means for detecting a reduction in the supply of energy to the load, preheating control means connected to the operational sensing means and the starter device for alternately preheating the engine and operating the starter device, means responsive to operation of the engine for isolating the starter device from the preheating control means and latch means responsive to restoration of normal operating conditions for maintaining the starting device isolated to prevent operation thereof.

2. The combination of claim 1 wherein said engine includes an exhaust outlet, said starter isolating means comprising a closure biased to a position closing said outlet while the engine is inoperative, switch means connected to the current responsive means for preventing operating thereof when actuated, and means responsive to opening of the closure by discharge of combustion products for actuating the switch means.

3. The combination of claim 2 including means responsive to malfunction of the heating means for initiating operation of the starter device.

4. The combination of claim 3 including overload sensing means interconnecting the heating means and the preheating control means for terminating heating of the engine.

5. The combination of claim 4 including starter control means for by-passing the overload sensing means in response to termination of heating.

6. The combination of claim 1 including means responsive to malfunction of the heating means for initiating operation of the starter device.

7 The combination of claim 1 including overload sensing means interconnecting the heating means and the preheating control means for terminating heating of the engine.

8. The combination of claim 7 including starter control means for by-passing the overload sensing means in response to termination of heating.

9. The combination of claim 1 wherein said starter isolating means includes an exhaust gas pressure sensor.

10. The combination of claim 6 including means responsive to malfunction of the heating means for initiating operation of the starter device.

11. The combination of claim 6 including overload sensing means interconnecting the heating means and the preheating control means for terminating heating of the engine.

12. The combination of claim 11 including starter control means for by-passing the overload sensing means in response to termination of heating.

13. In combination with a combustion engine having preliminary heating means and a starter, a standby generator driven by the engine for supplying energy to a load normally powered from a primary source and means for automatically starting the engine, comprising means for detecting a reduction in energy supplied to the load from said primary source to initiate operation of the heating means during a heating cycle, control means connected to the starter for preventing operation thereof during said heating cycle, thermal sensing means connected to the heating means and the control means for rendering the starter operative in response to termination of the heating cycle, starting circuit means connected in by-pass relation to the heating means during a starting cycle for reducing the resistance of the heating means to maintain the thermal sensing means operative during the starting cycle, means responsive to discharge of exhaust gas from the engine for terminating the starting cycle, and means responsive to the output of the generator for disabling the thermal sensing means to prevent recycling.

14. The combination of claim 13 including indicating means for registering malfunction of the heating means, said control means being operative to initiate the starting cycle in response to said malfunction of the heating means.

* * * * *